US012148367B2

(12) United States Patent
Kim et al.

(10) Patent No.: US 12,148,367 B2
(45) Date of Patent: Nov. 19, 2024

(54) BURN-IN COMPENSATION FOR DISPLAY

(71) Applicant: Google LLC, Mountain View, CA (US)

(72) Inventors: Hyunchul Kim, Mountain View, CA (US); Sun-il Chang, San Jose, CA (US); Wonjae Choi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 133 days.

(21) Appl. No.: 17/596,047

(22) PCT Filed: Nov. 20, 2019

(86) PCT No.: PCT/US2019/062447

§ 371 (c)(1),
(2) Date: Dec. 2, 2021

(87) PCT Pub. No.: WO2021/101537

PCT Pub. Date: May 27, 2021

(65) Prior Publication Data

US 2022/0157234 A1 May 19, 2022

(51) Int. Cl.
*G09G 3/3208* (2016.01)

(52) U.S. Cl.
CPC ..... *G09G 3/3208* (2013.01); *G09G 2320/046* (2013.01); *G09G 2320/048* (2013.01)

(58) Field of Classification Search
CPC ........... G09G 3/3208; G09G 2320/046; G09G 2320/048; G09G 5/04; G09G 2320/0233;
(Continued)

(56) References Cited

U.S. PATENT DOCUMENTS

2016/0140905 A1 5/2016 Yoo et al.
2017/0069238 A1 3/2017 Moon et al.
(Continued)

FOREIGN PATENT DOCUMENTS

CN 108227192 6/2018
CN 108461521 8/2018
(Continued)

OTHER PUBLICATIONS

International Search Report and Written Opinion for PCT Application No. PCT/US2019/062447, mailed on Jul. 21, 2020, 15 pages.
(Continued)

*Primary Examiner* — Abhishek Sarma
(74) *Attorney, Agent, or Firm* — Fish & Richardson P.C.

(57) ABSTRACT

A burn-in compensation method and a computing device configured for burn-in compensation is disclosed. The burn-in compensation can minimize or eliminate a burn-in of an OLED display having areas with different pixel densities. Each area of the OLED display may be divided into zones that include one or more pixels and a burn-in factor may be computed for the zones. A limiting burn-in factor may be determined from a limiting zone that exhibits the highest burn-in. Other zones with burn-in factors that area significantly different from the limiting burn-in factor can be
(Continued)

adjusted so that the pixels in the adjusted zones can be driven to radiate similar light at a power similar to the liming zone. The burn-in compensation may be performed for each area and a transition region may be created between areas to minimize light artifacts after burn-in compensation.

10 Claims, 16 Drawing Sheets

(58) Field of Classification Search
CPC ..... G09G 2320/0285; G09G 2320/029; G09G 2320/043; G09G 2320/0686; G09G 2340/0407
See application file for complete search history.

(56) References Cited

U.S. PATENT DOCUMENTS

| | | | |
|---|---|---|---|
| 2017/0076661 A1 | 3/2017 | Zhang et al. | |
| 2017/0116915 A1 | 4/2017 | Song et al. | |
| 2017/0162109 A1 | 6/2017 | An et al. | |
| 2018/0174520 A1 | 6/2018 | Park et al. | |
| 2018/0190174 A1 | 7/2018 | Kambhatla et al. | |
| 2020/0066809 A1* | 2/2020 | Liu | G09G 3/3225 |

FOREIGN PATENT DOCUMENTS

| | | |
|---|---|---|
| CN | 109377945 | 2/2019 |
| CN | 109690667 | 4/2019 |
| KR | 10-2017-01336028 | 12/2017 |
| WO | WO 2015092661 | 6/2015 |
| WO | 2019062236 A1 | 4/2019 |
| WO | WO 2019132445 | 7/2019 |

OTHER PUBLICATIONS

International Preliminary Report on Patentability in International Appln. No. PCT/US2019/062447, mailed on Jun. 2, 2022, 13 pages.
Office Action in Chinese Appln. No. 201980100740.3, mailed on Feb. 27, 2024, 16 pages (with English translation).
Office Action in European Appln. No. 19817559.8, mailed on Dec. 13, 2023, 14 pages.
Notice of Allowance in Chinese Appln. No. 201980100740.3, mailed on Sep. 29, 2024, 7 pages (with English translation).

* cited by examiner

BURN-IN COMPENSATION FOR DISPLAY

CROSS-REFERENCE TO RELATED APPLICATION

This application is a 35 U.S.C. § 371 National Phase Entry Application from PCT/US2019/062447, filed on Nov. 20, 2019, entitled "BURN-IN COMPENSATION FOR DISPLAY", the disclosure of which is incorporated herein by reference in its entirety.

FIELD OF THE DISCLOSURE

The present disclosure relates to flat-panel displays and more specifically to a burn-in compensation method for an organic-light-emitting-diode (OLED) display.

BACKGROUND

OLED displays include pixels that emit light when in response to an applied current. Each pixel may include an electroluminescent layer (e.g., organic thin film) disposed between an anode electrode and a cathode electrode. One or both of the electrodes may be transparent to allow light generated by the electroluminescent layer to propagate from the electroluminescent layer though the electrode(s). The pixels of the OLED may be addressed using thin film transistors (TFT) that can be controlled by a driver integrated circuit (i.e., driver IC) so that each pixel receives (i.e., is driven by) a current corresponding to an intensity designated by a pixel level. For example, an intensity may a level selected from a range of possible pixel levels (e.g. 0-255). To represent color images, separate color channels (e.g., red, green, blue) may be specified for each pixel.

An OLED display may be desirable when compared with other display technologies for a variety of reasons. For example, an OLED display can be made thinner and more efficient than other display technologies. Because each pixel of the OLED display emits light, the OLED display requires no backlight and may not require color filters as required by, for example, a liquid crystal display (LCD). The thin nature of the OLED display can facilitate flexibility (and in some cases transparency). For example, in some implementations, an OLED display may be foldable. Additionally, the emissive pixels of the OLED may lead to a higher contrast, a high brightness, a wider viewing angle, and a faster refresh rate than other display technologies. Despite these advantages, an OLED display may have problems that can limit its use.

One problem with an OLED display is related to a degradation in visible intensity (i.e., luminance) through use. For example, a luminance of pixel produced by a current designated by a pixel level may decrease through use. This can result in a phenomenon (i.e. burn-in) in which more-used pixels appear different (e.g., darker) than less-used pixels. To compensate for burn-in, more-used pixels may be driven differently than less-used pixels. It is in this context that implementations of the disclosure arise.

SUMMARY

In at least one aspect, the present disclosure generally describes techniques for reducing (deleterious) effects of burn-in of an organic light emitting diode (i.e., OLED) display. For example, burn-in factors for zones in an area of the OLED display are estimated. A limiting burn-in factor may be determined from the (estimated) burn-in factors and burn-in factors that are significantly different from the burn-in factor can be adjusted to update the burn-in factors for the zones in the area. A driver integrated circuit (i.e., driver IC) may then be controlled according to the updated burn-in factors to minimize the effects of burn-in in the area of the OLED display.

In a possible implementation, each zone can include one or more pixels, and each of the one or more pixels in each zone can be driven according to the updated burn-in factor for the zone.

In a possible implementation, the techniques can be applied to other areas (e.g., at least one other area) of the OLED display, because the OLED display has multiple areas of different pixel densities.

In another possible implementation, the techniques can be applied over the life of the display to minimize the burn-in of the OLED display over time.

In at least one aspect, the present disclosure generally describes a method for reducing effects of burn-in of an OLED display. The method comprises estimating burn-in factors for a plurality of zones in a first area of the OLED display, determining a limiting burn-in factor from the estimated burn-in factors, adjusting the estimated burn-in factors that are significantly different from the limiting burn-in factor, updating, in a memory, the burn-in factors for the plurality of zones in the first area to include the adjusted burn-in factors, and controlling a driver IC according to the updated burn-in factors to reduce the effects of burn-in in the first area of the OLED display.

A burn-in factor for a zone may indicate a pixel efficiency for the zone. A relatively low burn-in factor for a zone may correspond to the zone having a relatively low pixel efficiency. A relatively high burn-in factor for a zone may correspond to the zone having a relatively high pixel efficiency.

An estimated burn-in factor that is significantly different from the limiting burn-in factor may be an estimated burn-in factor that satisfies a threshold, e.g. is greater than a threshold. The threshold may be determined based on limiting burn-in factor.

Controlling the driver IC according to an updated burn-in factor may comprise adjusting a driving signal for a pixel corresponding to a digital count for the pixel, said adjusting based on the updated burn-in factor.

The method may further comprise estimating burn-in factors for a plurality of zones in a second area of the OLED display, wherein the second area has a pixel density that is different from a pixel density of the first area of the OLED display, determining a limiting burn-in factor from the estimated burn-in factors for the plurality of zones in the second area, adjusting the estimated burn-in factors for the plurality of zones in the second area that are significantly different from the limiting burn-in factor for the second area, updating, in a memory, the burn-in factors for the plurality of zones in the second area to include the adjusted burn-in factors of the second area, and controlling a driver IC according to the updated burn-in factors to reduce the effects of burn-in in the second area of the OLED display.

The method may further comprise repeating the estimating, the determining, the adjusting, the updating, and the controlling for the first area of the OLED display to minimize the effects of burn-in in the first area of OLED display over time.

The OLED display may have a high-pixels-per-inch (high-PPI) area and a low-pixels-per-inch (low-PPI) area. For example, the high-PPI area has a higher number of pixels per inch than the low-PPI area.

The method may further comprise designating a transition area between the high-PPI area and the low-PPI area, and computing burn-in factors for the transition area that gradually change from the high-PPI area to the low-PPI area.

Each zone of the plurality of zones may include one or more pixels. Each of the one or more pixels in each zone may be driven according to the updated burn-in factor for the zone.

The estimating burn-in factors for zones in an area of the OLED display may include, for each zone, computing a representative pixel level for the zone, determining a short-term usage for the zone, determining a cumulative usage for the zone; and relating the cumulative usage to an estimate of the burn-in factor. The short-term usage for the zone may be determined based on the representative pixel level for the zone. The cumulative usage for the zone may be determined based on the short-term usage for the zone.

The short-term usage for the zone may be an average pixel level for the zone over a window period.

The cumulative usage may be a running total of the short-term usage over time.

The estimate of the burn-in factor may be derived from a statistical analysis of a group of OLED displays that are similar to the OLED display.

The determining a limiting burn-in factor from the burn-in factors may include determining a minimum burn-in factor of the burn-in factors. For example, the limiting burn-in factor may be the burn-in factor which indicates the zone having the lowest pixel efficiency.

The adjusting burn-in factors that are significantly different from the limiting burn-in factor may include, determining a burn-in factor difference between the burn-in factor of a zone and the limiting burn in factor, comparing the burn-in factor difference to a threshold, and adjusting the burn-in factor for the zone to match the limiting burn-in factor when the burn-in factor difference is above the threshold, and repeating the determining, comparing, and adjusting for other zones in the area.

The method may further comprise not adjusting the burn-in factor for the zone to match the limiting burn-in factor when the burn-in factor is below the threshold.

In at least one aspect, the present disclosure generally describes a mobile computing device comprising an OLED display panel, a driver integrated circuit (IC) and an applications processor configured by software instructions to carry out the method described above.

In at least one aspect, the present disclosure generally describes a mobile computing device. The mobile computing device comprises, an OLED display panel that includes a plurality of areas having different pixel densities, each of the plurality of areas having a plurality of zones, each of the plurality of zones having a plurality of pixels a driver integrated circuit (IC) configured to, for each of the plurality of zones in each of the plurality of areas, convert a digital count into a driving signal that causes the plurality of pixels of the zone to radiate light at a level corresponding to the digital count, an applications processor configured by software instructions to reduce a burn-in of each of the plurality of areas of the OLED display by, estimating burn-in factors for the plurality of zones in the area of the OLED display, determining a limiting burn-in factor from the estimated burn-in factors, adjusting the estimated burn-in factors that are significantly different from the limiting burn-in factor; updating, in a memory, the burn-in factors for the plurality of zones in the area to include the adjusted burn-in factors, and controlling the driver IC to adjust the driving signal for the plurality of pixels in each zone of the area according to a corresponding updated burn-in factor to reduce the burn-in of the area of the OLED display.

The applications processor may be further configured by software instructions to minimize a burn-in of each area of the OLED display by repeating the estimating, the determining, the adjusting, the updating, and the controlling for the plurality of areas of the OLED display to minimize the burn-in in the area of OLED display over time.

The applications processor may be further configured by software instructions to estimate the burn-in factors for the plurality of zones in an area of the OLED display by, for each zone, computing a representative pixel level for the zone, determining a short-term usage for the zone, determining a cumulative usage for the zone, and relating the cumulative usage to an estimate of the burn-in factor.

The applications processor may be further configured by software instructions to relate the cumulative usage to an estimate of the burn-in factor by retrieving the estimate of the burn-in factor from a memory, the estimate of the burn-in factor derived from a statistically analysis of a group of OLED displays that are similar to the OLED display.

The applications processor may be further configured by software instructions to adjust the estimated burn-in factors that are significantly different from the limiting burn-in factor by, determining a burn-in factor difference between the burn-in factor of a zone and the limiting burn in factor, comparing the burn-in factor difference to a threshold, and adjusting the burn-in factor for the zone to match the limiting burn-in factor when the burn-in factor difference is above the threshold, and repeating the determining, comparing, and adjusting for other zones in the area.

In another aspect, the present disclosure generally describes a mobile computing device that includes an OLED display panel having areas of different pixel densities and each area being subdivided into zones of pixels. The mobile computing device further includes a driver IC that is configured to (for each zone) convert a digital count (i.e., pixel level) into a driving signal that causes pixels in the zone to radiate light at a level corresponding to the digital count. The mobile computing device further includes an applications processor that is configured by software instructions to reduce effects of burn-in of each area of the OLED display by performing a method that includes: estimating burn-in factors for the zones in the area of the OLED display; determining a limiting burn-in factor from the estimated burn-in factors; adjusting burn-in factors that are significantly different form the limiting burn-in factor; updating the burn-in factors for the zones in the area; and controlling the driver IC to adjust the driving signal for pixels in each zone of the area according to a corresponding update burn-in factor to minimize the effects of burn-in in the area of the OLED display.

In another aspect, the present disclosure generally describes a non-transitory computer-readable storage medium (e.g., memory) containing program code that when executed by a processor (e.g., applications processor) of a computing device causes the computing device to perform a method for reducing effects of burn-in of an OLED display of the computing device. The method includes: estimating burn-in factors for zones in an area of the OLED display; determining a limiting burn-in factor from the burn-in factors; adjusting burn-in factors that are significantly different form the limiting burn-in factor; updating the burn-in factors for the zones in the area; and controlling a driver IC according to the updated burn-in factors to minimize the burn-in in the area of the OLED display.

Optional features of one aspect (such as the method) may be combined with any other aspect.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

FIG. 1 is a front perspective view of an OLED display exhibiting a residual image caused by burn-in.

The components in the drawings are not necessarily to scale relative to each other. Like reference numerals designate corresponding parts throughout the several views.

DETAILED DESCRIPTION

The present disclosure describes burn-in compensation for an OLED display having areas of different pixel density (i.e., multiple resolution areas) in the same display. The disclosed burn-in compensation can manage a burn-in compensation for each resolution area based on its use over time and can minimize or eliminate a boundary effect between the resolution areas caused by their separate burn-in compensation. For example, a visible defect (e.g., a line) between areas can be minimized or eliminated through the disclosed approach. In this way, the disclosed subject matter addresses technical problems associated with the effects of burn-in on displays.

Burn-in may be a problem with OLED displays. A burn-in results from a non-uniform degradation of pixel efficiency and can manifest as a residual image (i.e., a shadow image) on the display (i.e., screen). The burn-in may result from pixel use and/or an imperfect manufacturing process. Unlike a burn-in on an LCD display, a burn-in on an OLED display is irreversible without compensation.

Figure 1:
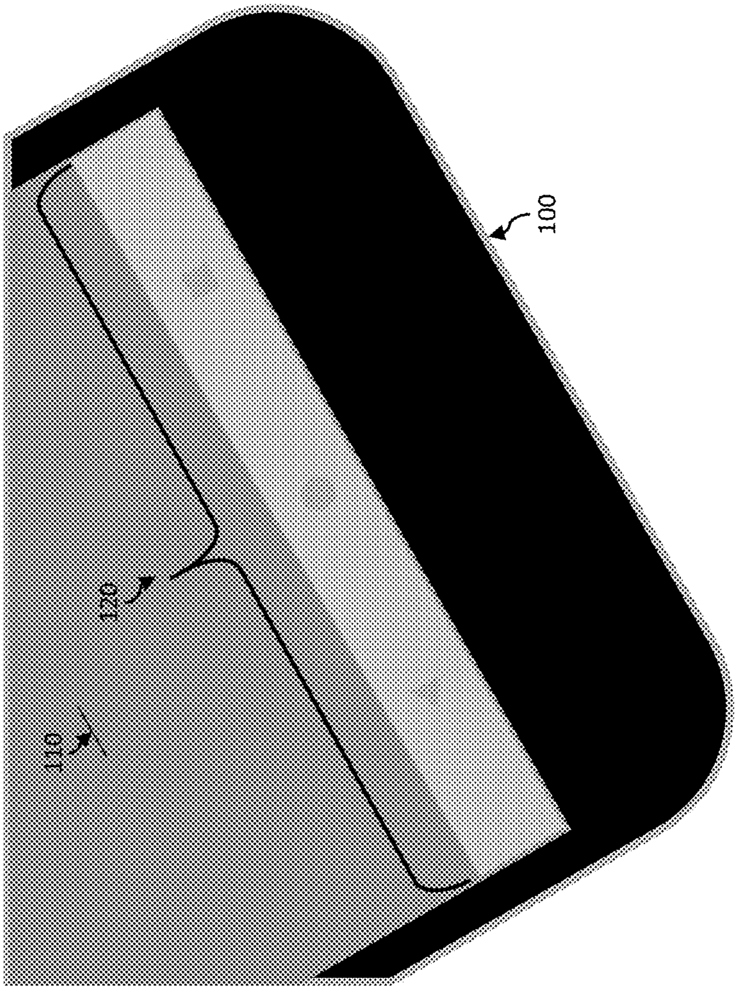

FIG. 1 illustrates a mobile computing device 100 (e.g., mobile phone, tablet, etc.) having an OLED display 110 including pixels exhibiting a burn-in. The pixels of the OLED display 110 shown are all driven at substantially the level. Despite this uniform driving condition, a residual image 120 of a previously displayed user interface (UI) is visible. A residual image resulting from burn-in may appear as a negative of a normally displayed image. For example, bright pixels in the normally displayed image may be darker in a corresponding residual image. This relationship results because an efficiency of an OLED pixel decreases with its use. Thus, an OLED pixel may appear dimmer over time.

The use of an OLED pixel may correspond to energy of the light generated by the OLED pixel (i.e., a power of the light generated by the pixel integrated over time). The power of light generated by an OLED pixel at a particular time depends on a driving signal corresponding to a pixel level designated for the pixel. A designated higher pixel level configures circuitry to drive the pixel with a higher voltage and/or current in order to generate more light. Thus, pixels driven (on average) with higher pixel levels are used more than pixels driven (on average) with lower pixel levels. Accordingly, a display may have pixels of various efficiencies (i.e., burn-in levels). When pixels having different efficiencies (i.e., burn-in levels) are driven similarly, the pixels will transmit light at different powers (i.e., intensity, luminance). When a difference between the burn-in levels of pixels becomes significant (e.g., due to an image displayed for a prolonged period) a burn-in artifact, such as a residual image, may become observable.

To compensate for non-uniform pixel use (i.e., pixel aging), more-used pixels may be driven at different currents than lesser-used pixels. For example, in order to have the same luminance, a more-used pixel may be driven using a first current while a lesser-used pixel may be driven using a second current. For example, the more-used (i.e., less efficient) pixel may be driven with a first current that is higher than the second current in order to increase the luminance of the more-used pixel so that its luminance is made the same as the lesser-used (i.e., more efficient) pixel. In other words, a burn-in compensation may be based on increasing (i.e., boosting) a driving point of more-used (i.e., dimmer) pixels. Alternatively, the lesser-used pixel may be driven at a second current that is lower than the first current in order to decrease the luminance of the lesser-used pixel so that its luminance is made the same as the more-used pixel. In other words, a burn-in compensation may be based on decreasing (i.e., bucking) the driving point of less-used (i.e. brighter) pixels. The present disclosure can be applied to either type of burn-in compensation, but the burn-in compensation based on decreasing brighter pixels (i.e., pixels with less burn-in) to match darker pixels (i.e. pixels with more burn-in) will be considered because this type may offer some advantages (e.g., power consumption) in certain implementations.

OLED displays may be used in a variety of applications (e.g., televisions, mobile phones, tablets, etc.). The resolution of an OLED display is related to the number of pixels per inch (i.e., pixel density). In some applications (e.g., a smart phone, tablet) it may be desirable for a single display panel (i.e., display) to have different pixel densities in different areas within the same display panel. In general, a display panel may have any number of different areas and any number of different pixel densities (i.e., pixel resolutions, pixels per inch) corresponding to the different areas.

Figure 2:
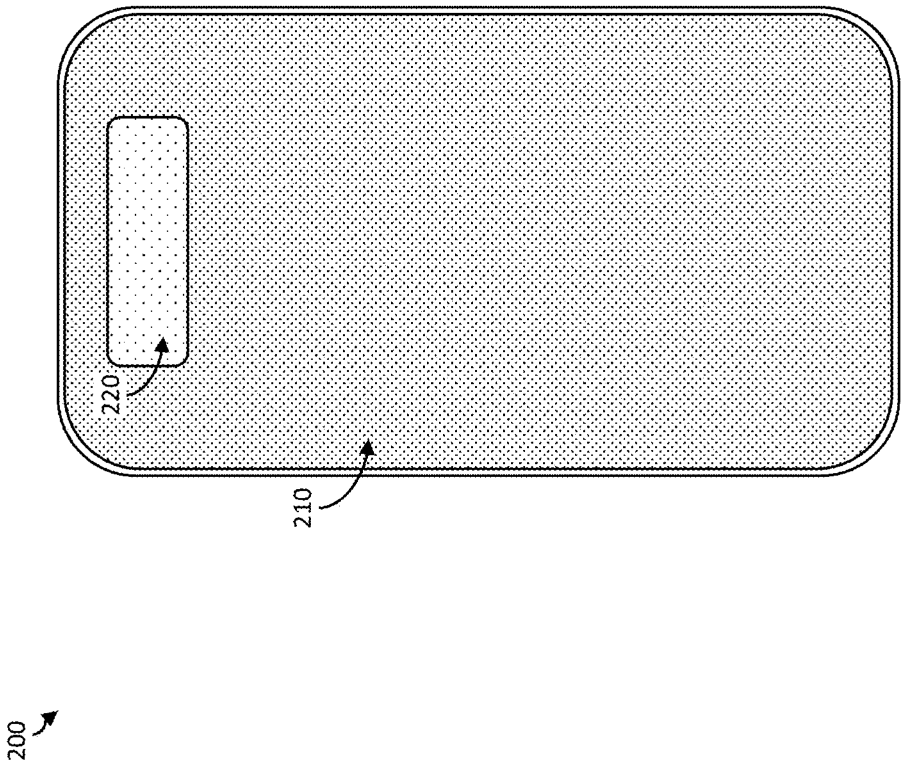
FIG. 2 is a front view of a mobile computing device having an OLED display with areas of different pixel densities.

FIG. 2 illustrates a multi-area OLED display according to an implementation of the present disclosure. As shown, the multi-area OLED display may occupy a majority of a front surface a mobile computing device 200 (e.g., mobile phone). The OLED display of the mobile computing device 200 in the implementation shown includes a high pixels-per-inch (i.e., high-PPI) area 210 and a low pixels-per-inch (low-PPI) area 220 (i.e., high relative to low and low relative to high). One possible motivation for this display configuration may be based on a light device or light devices (e.g., light sensors, light source) positioned behind the low-PPI area 220 of the OLED display. The low-PPI area 220 may allow enough light to propagate through the area that the light device (or light devices) can function. Thus, an operating display (albeit at a lower resolution) may be extended over an area that was once exclusively dedicated to the light device or light devices.

Pixels in the areas of the OLED display having different pixel densities may be driven differently. For example, for a given pixel level, each pixel in the low-PPI area 220 (i.e., low pixel density area) may be driven to be brighter for a given pixel value than each pixel in a high-PPI area 210 (i.e., high pixel density area). In other words, for a given pixel level, pixels in the lower pixel density 220 area may each be made brighter than pixels in the higher pixel density area 210 in order to compensate for the lower number of pixels. When this adjustment is made the luminance per unit area from the low-PPI area 220 (i.e., portion) of the display may be made equal to the luminance per unit area from the high-PPI area 210 (i.e., portion) of the display. In other words, the areas appear to have the same brightness.

The disclosed burn-in compensation techniques are described for an OLED display having two areas (e.g., a high-PPI area and a low-PPI area), such as shown in FIG. 2; however, the present disclosure is not limited this implementation. The disclosed techniques may be applied to OLED displays having additional areas of the same or different pixel densities. Further, the areas of different pixel densities may be any shape, any size, and in any relative spatial configuration.

Figure 3:
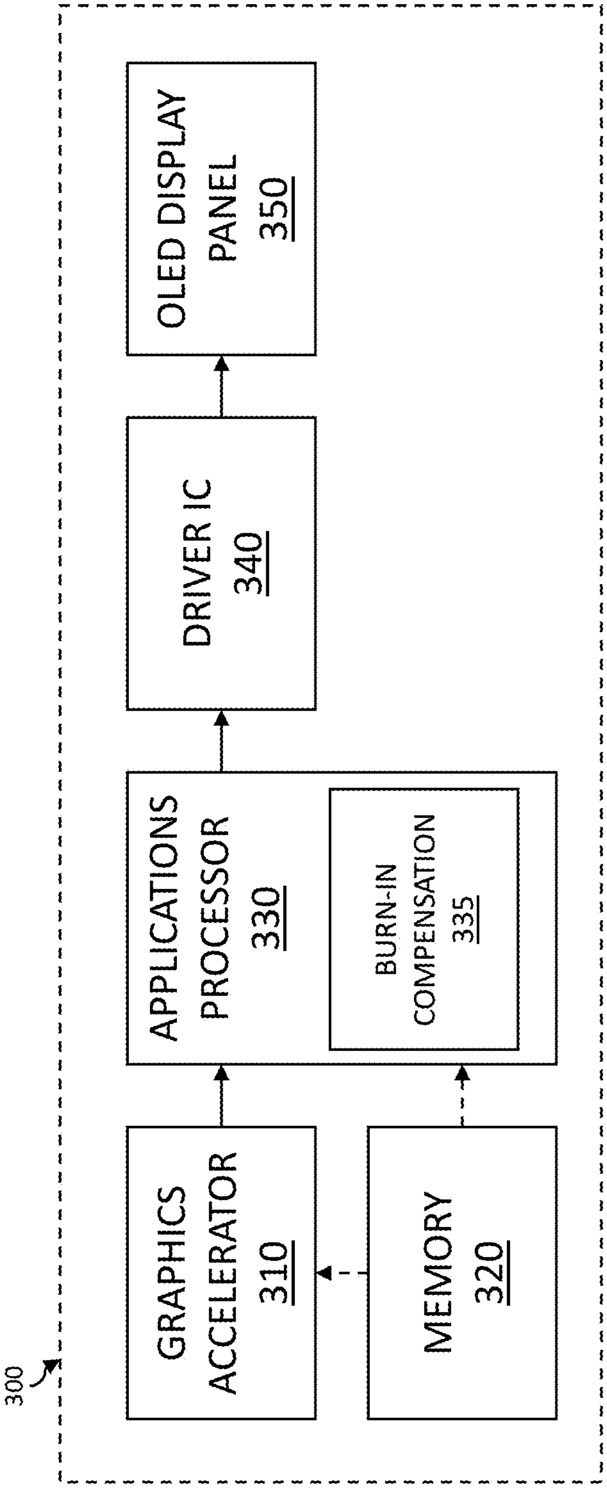
FIG. 3 is a system block diagram of a portion of a mobile computing device including an OLED display with burn-in compensation.

The disclosed burn-in compensation may be implemented as software, firmware, and/or hardware of a computing device (e.g., a mobile computing device). FIG. 3 is a system block diagram of a portion of a mobile computing device (e.g., mobile phone, tablet) configured with burn-in compensation. The mobile computing device 300 includes a graphics chip (i.e., graphics accelerator) 310 and an applications processor 330 to handle the processing necessary to control a driver IC 340 to configure the current supplied to pixels on an OLED display panel 350 (i.e., OLED display) in order to generate a viewable image. For example, a digital image (e.g., JPEG image) may be stored in a memory 320 and may be processed (e.g., by the graphics accelerator and/or applications processor) to assign pixel values from a range of possible pixel values (e.g., 0-255) to corresponding pixels in the OLED display. The driver IC 340 is configured to convert the pixel values into the necessary signals to control the light level of each pixel. For example, the driver IC may control one of more transistors corresponding to a pixel in a particular row and column of the OLED display panel 350 to provide a current to a pixel, with the level of the current related to the pixel value. In other words, the driver IC 340 may function as an amplifier (e.g., voltage-controlled current-source) to provide each pixel a signal (e.g., a current) with an amplitude (e.g., current level) corresponding to a pixel level. For example, a higher pixel level corresponds to a larger amplitude signal at a corresponding output of the driver IC. Additionally, as will be discussed, the amplitude of the signal provided to each pixel may be further adjusted to compensate for a burn-in corresponding to the pixels of the OLED display panel.

As shown in FIG. 3, the applications processor (AP) may be configured to perform burn-in compensation 335. For example, the AP may be configured by software instructions retrieved from a non-volatile computer readable memory (e.g., memory 320) to perform a method for burn-in compensation. When configured for burn-in compensation, the AP 330 can adjust signals from the graphics chip 310 in order to control the driver IC to increase or decrease the amplitude of the signal for a given pixel level. Accordingly, the disclosed burn-in compensation 335 can operate without affecting the operation of the graphics accelerator 310 or the driver IC 340. In other words, no adjustment to display processes or circuitry in the mobile computing device 300 is necessary to implement the disclosed burn-in compensation.

Figure 4:
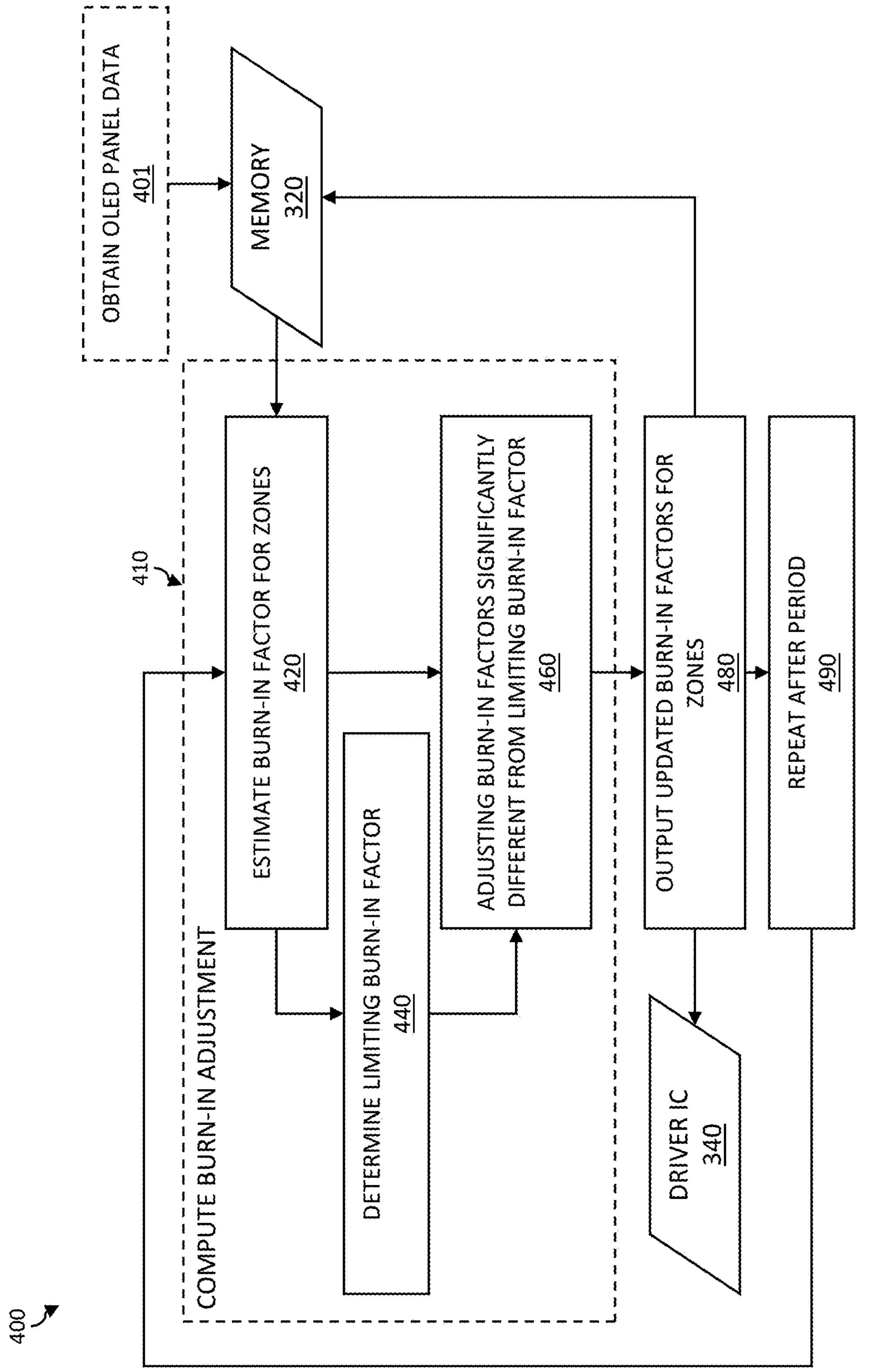
FIG. 4 is a flowchart of a method for burn-in compensation according to an implementation of the present disclosure.

FIG. 4 is a flowchart of a method for burn-in compensation according to an implementation of the present disclosure. The method 400 may be performed on different areas of an OLED display having multiple areas. For example, the method 400 may be performed for a first area having a first pixel density and performed for a second area having a second pixel density. The method performed for the first area may be carried out (i.e., executing) in parallel or in sequence with the method performed for the second area.

Each of the areas may be subdivided into zones to ease the calculation requirements for the method. A zone can include one or more pixels. Each zone may be sized so that a single pixel level and burn-in factor may represent all the pixels within the zone and so that pixels in a zone may have similar physical and electrical properties due to their proximity. Further, the pixels in a zone may have similar usage properties because a pixel density of a zone is typically much higher than a spatial frequency of a displayed image.

The method 400 may be carried out periodically over the life of an OLED display so that a burn-in compensation may be modified as the OLED display is used. Each iteration of the method 400 may use short term statistical information as well as cumulative information from previous iterations. Accordingly, the method 400 may store and retrieve the results of iterations to and from the memory 320 of the mobile computing device.

The method may also store and retrieve OLED panel data to and from the memory 320 of the mobile computing device. OLED panel data may include information regarding the areas, zones, and pixels of the OLED display. Besides area and zone designations, the OLED panel data may include statistical operating data associated with the OLED panel. The OLED panel data may be obtained 401 through a statistical analysis (e.g., design of experiments) performed on a group of representative samples of OLED displays similar to the OLED display analyzed by the method 400. This step of obtaining 401 OLED panel data may take place at a different time (e.g., earlier) and at a different place (e.g., factory) than when other steps of the method 400 are performed. Accordingly, the OLED panel data may be stored (e.g., factory set) in the memory 320 of the mobile computing device. In a possible implementation, the OLED panel data can be updated based on the results of the method 400.

The method for burn-in compensation includes computing 410 a burn-in adjustment necessary to compensate for a variation in the light output from the zones in the area. The computing 410 includes estimating 420 a burn-in factor for zones (e.g., for each zone) in the area. In a possible implementation, each zone is assigned one burn-in factor to represent the burn-in for all of the pixels in the zone. The burn-in factor corresponds to a representative pixel efficiency estimated for the zone based on the zone's usage. As a pixel (or pixels) in a zone is used, the efficiency pixel (or pixels) for the zone decreases. Accordingly, in a possible implementation, the burn-in factor for each zone decreases with the zone's usage.

The computing 410 of the burn-in adjustment also includes determining 440 a limiting burn-in factor for the zones in the area. In other words, the limiting zone of the area may be determined. The limiting zone may be the zone with the most extreme burn-in factor (i.e., the limiting burn-in factor) of all the zones in the area. Each zone may be used differently and therefore may have a different luminescence for a particular pixel level. In order to adjust the pixels, to have similar luminesce for a given pixel level, the output of brighter pixels can be reduced to match dimmer pixels. The limiting zone can have a limiting burn-in factor that is the minimum burn-in factor of all the zones. The minimum burn-in factor may correspond to the least efficient (i.e., dimmest zone for a particular pixel level) pixels and can serve as a baseline to which all other zones can be compared and/or adjusted.

The computing 410 of the burn-in adjustment can also include adjusting 460 the burn-in factors for zones having a burn-in factor that is significantly different form the limiting burn-in factor. The adjusting 460 may include comparing the burn-in factors for the zones (e.g., for each zone) to the limiting burn-in factor and determining the burn-in factors (zones) that are significantly different from the limiting burn-in factor (limiting zone). The adjustment can affect a driving signal for pixels of a zone so that for a given pixel-level the zone outputs a luminesce that is similar (e.g., the same) as the liming zone when the limiting zone is driven at the same pixel level. For example, a (brighter) zone with an efficiency of 90% can be made to appear as it has the same efficiency of a (dimmer) limiting zone with an efficiency of 30% if the brighter zone and its driving signals are calibrated (e.g., reduced) according to the limiting zone.

The method 400 further includes outputting 480 the updated burn-in adjustments (i.e., the maintained or adjusted burn in factors) to a driver IC. For example, the pixel or pixels in each zone can receive the same burn-in factor. The driver IC receives and is configured by the burn-in factors to minimize the variation in pixel output for the same pixel level. In addition, the method may also output intermediate and/or final results of the burn-in adjustment computation 410 to the memory 320. In this way, burn-in factors may be updated as the OLED panel is used. Accordingly, the method can include periodically performing the burn-in compensation by repeating 490, after a period, the burn-in adjustment for the zones.

Figure 5:
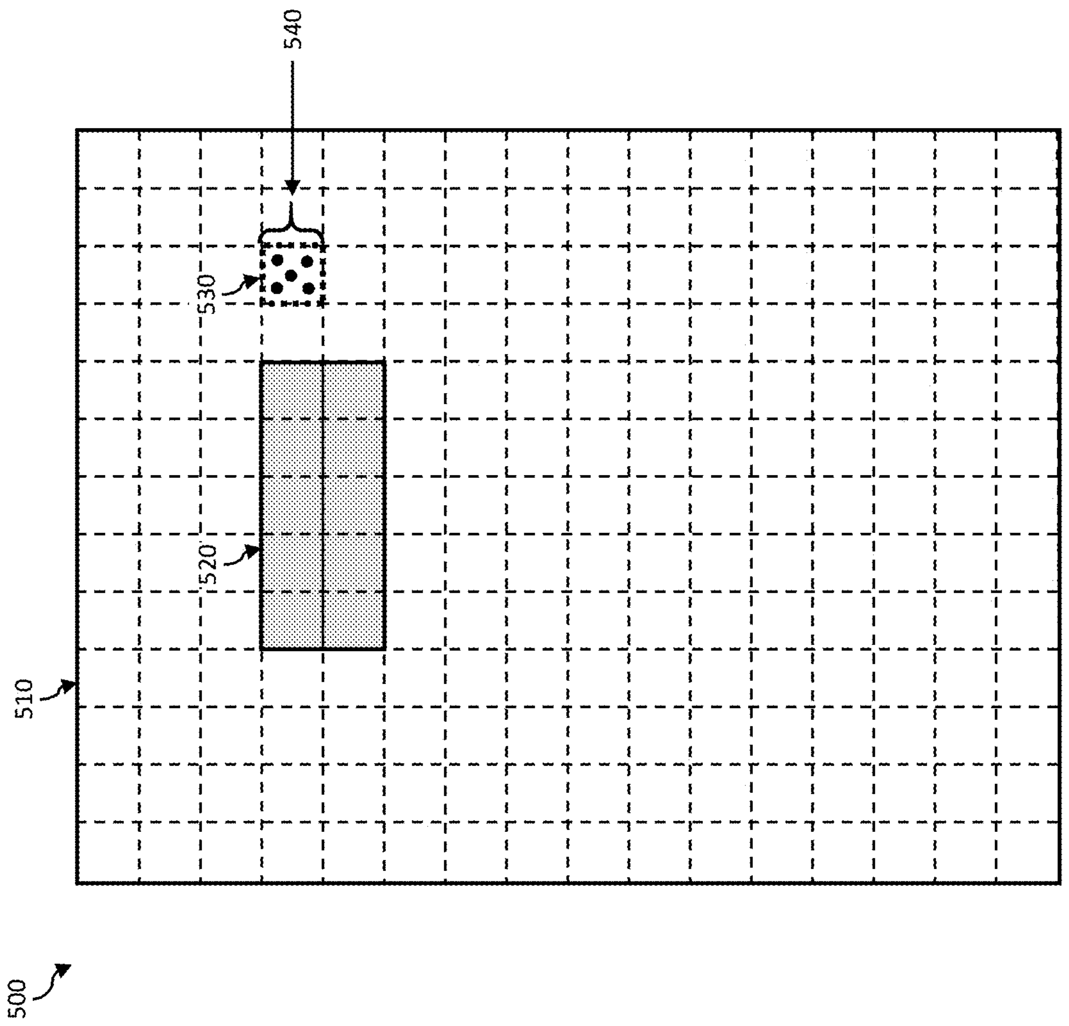
FIG. 5 is an illustration of an example OLED display divided into areas and zone according to an implementation of the disclosure.

To provide a better understanding of the method outlined above, an example implementation of the primary steps of the burn-in adjusting will be described in detail for an example the example OLED display shown in FIG. 5. The example OLED display 500 is divided into a first area 510 (e.g., high-PPI area) and a second area 520 (e.g., low-PPI area). Each area is further subdivided into zones (i.e., indicated by dotted lines). Each zone may contain one or more pixels. For example, a given zone 530 (i.e., the $i^{th}$ zone) of the first area 510 includes pixels 540 (i.e., five dots indicating pixels).

Each pixel in a zone may be driven with a different pixel level at any given time. Accordingly, to compute a burn-in factor for the zone, a representative pixel level for the zone may be derived. The representative pixel level may be any mathematical representation of the pixel levels. For example, the representative pixel level may correspond to the mean (average) of the pixel levels, the median pixel levels, or any other statistically meaningful representation of the pixel levels. Further, the representative pixel level of the zone may be referred to as the digital count (i.e., $D_C$) for the zone because pixels levels typically correspond to a digital representation (e.g., indicated in an image file).

Figure 6:
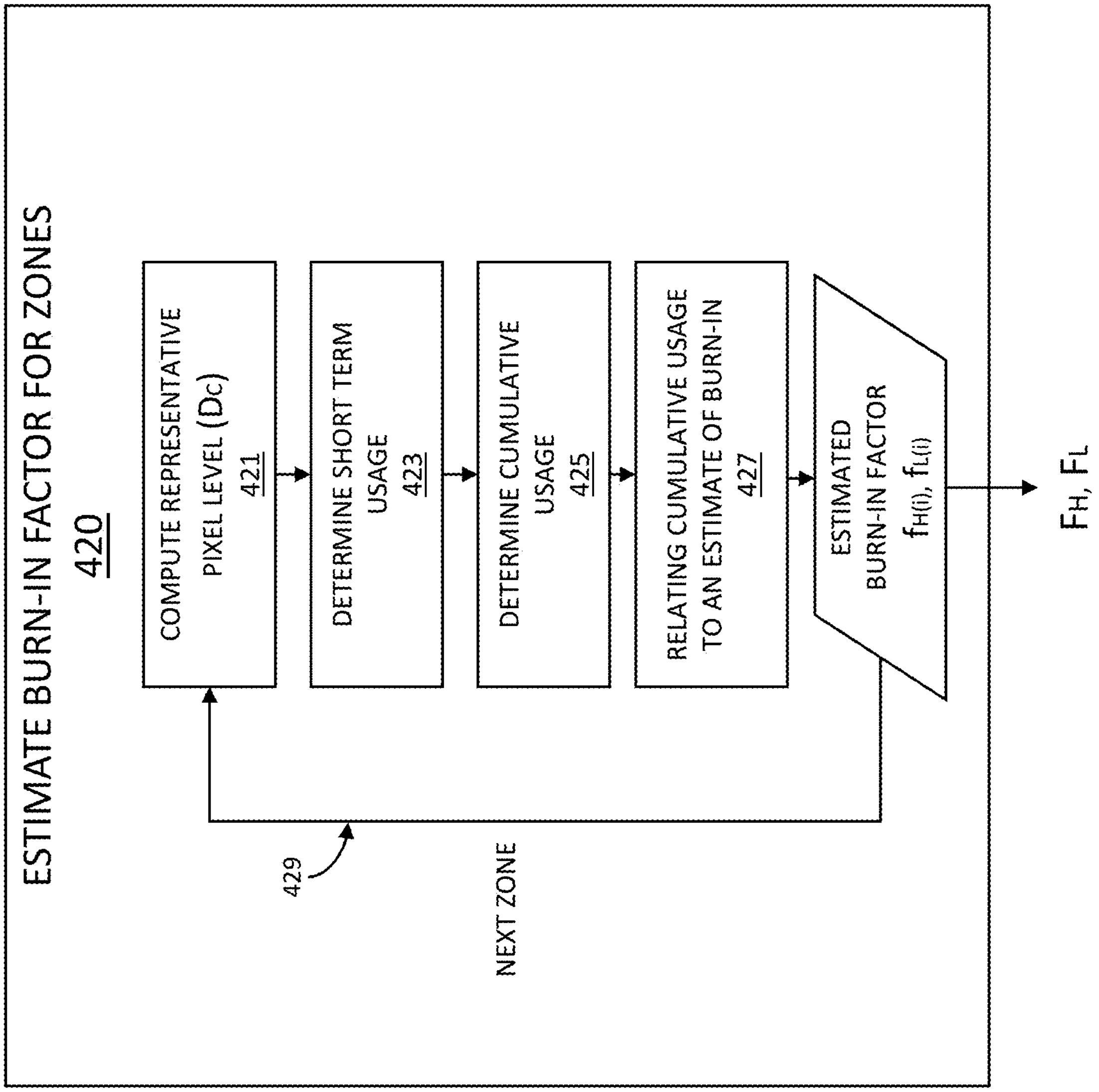
FIG. 6 is a flowchart for estimating a burn-in factor that can be used in the method of FIG. 4.

FIG. 6 includes possible details for the step of estimating 420 the burn-in factor for the method shown in FIG. 4. The step of estimating 420 includes computing 421 a digital count ($D_C$) for a zone. For example, for the $i^{th}$ zone 530 shown in FIG. 5, the digital count ($D_C$) may be the average of the five pixel-levels of the zone at a given time (t).

Figure 7:
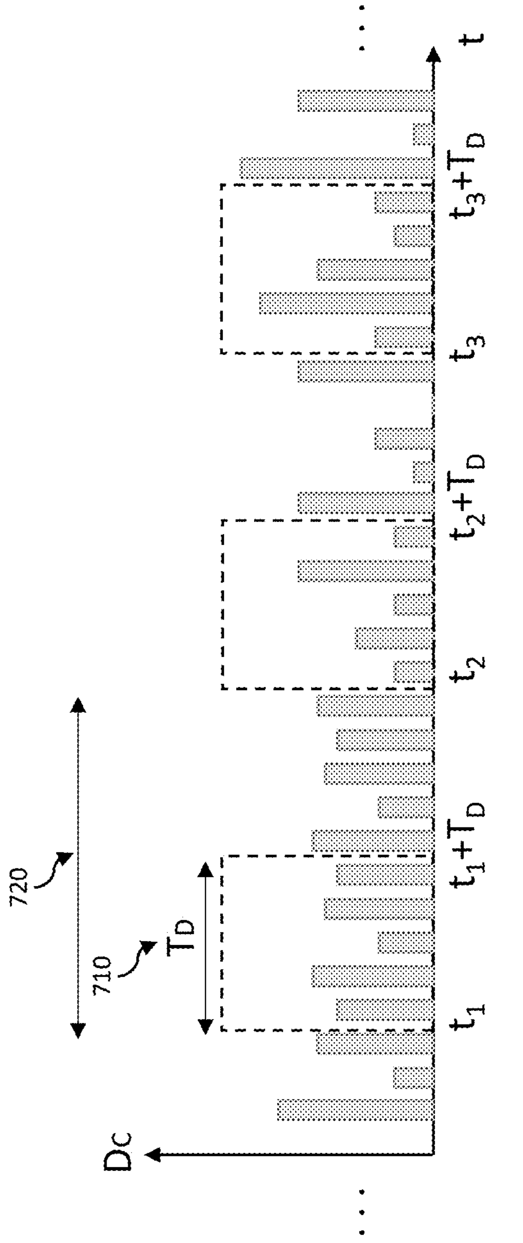
FIG. 7 is an example plot of a digital count ($D_C$) versus time for a zone.

Estimating 420 the burn-in factor also includes determining 423 a short-term usage for each zone using the digital count ($D_C$) for the zone. The digital count (i.e., pixel level) for each zone changes with time (i.e., $D_C(t)$). FIG. 7 is an example plot of a digital count (i.e. pixel level) versus time for a zone. The short-term usage can be computed as short-term average of the digital count for the zone (i.e., $E(D_C(t))$ over the window period). In other words, a short-term average of the digital count can be computed from a window corresponding to a window period of time, $T_D$, as in the equation below.

$$E_{T_D}[D_c(t)] = \frac{1}{T_D}\int_t^{t+T_D} D_C(t)dt$$

For example, as shown in FIG. 7, the short-term usage (e.g., at a time $t_1$) can be the average of the five values of $D_C$ collected (i.e., sampled) over the window period 710 (i.e., $T_D$).

As shown in FIG. 6, estimating 420 the burn-in factor also includes determining 425 a cumulative usage (i.e., long-term usage) for each zone. The cumulative usage for a zone may be computed as a running total of the short-term usages over time, as in the equation below.

$$\text{cumluative\_usage} = \int_0^t E_{T_D}[D_c(t)]dt$$

For example, as shown in FIG. 7 the cumulative usage may be the sum of the short-term usage (i.e., the average $D_C$) computed in windows at a first time ($t_1$), a second time ($t_2$) and a third time ($t_3$). The cumulative usage may be computed over a duration much longer than a short-term usage window period ($T_D$). For example, the cumulative usage may be computed over the life of the OLED panel. Accordingly, the short-term usage may be computed periodically, and the period 720 between short-term usage calculations may be selected based on a balance between computational efficiency and an ability to capture a decline in efficiency requiring burn-in compensation. As shown in FIG. 7, the short-term usage samples may be periodic with a period 720 between short-term usage samples that is longer than the short-term window period ($T_D$) 710.

As shown in FIG. 6, estimating 420 the burn-in factor also includes relating 427 the cumulative usage to a burn-in factor (i.e., pixel efficiency) for each zone. As mentioned, a burn-in factor for a zone may be related to a pixel efficiency for the zone. For example, a burn in factor for a given ($i^{th}$) zone in a high-PPI area may have a burn-factor, $f_{H(i)}$, that is between zero (e.g., 0% efficiency) and 1 (e.g., 100% efficiency). Likewise, a burn in factor for a given ($i^{th}$) zone in a low-PPI area may have a burn-factor, $f_{L(i)}$ that is between zero (e.g., 0% efficiency) and 1 (e.g., 100% efficiency). The burn-in factors (i.e., $f_{H(i)}$, $f_{L(i)}$) may generally decrease over time. For example, a limit of the burn-in factors as time is extended to infinity (i.e., $t\rightarrow\infty$) is zero.

Cumulative usage of a zone corresponds to (i.e., increases with) time. Accordingly, the burn-in factors (i.e., $f_{H(i)}$, $f_{L(i)}$) decrease as the cumulative usage increases. The details of how the burn-in factors decrease with cumulative usage may be described by a function or a curve. For example, the burn-in factors may decrease linearly with cumulative usage, as in the equation below.

$$f_{H(i)}, f_{L(i)} = \alpha \int_0^t E_{T_D}[D_c(t)]dt + \beta$$

Figure 8:
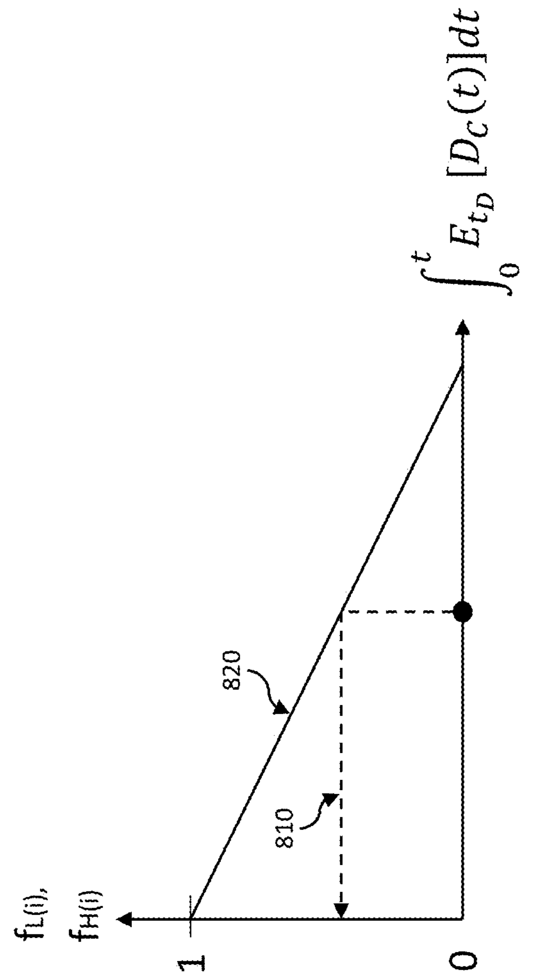
FIG. 8 is an example of an estimate of a burn-in factor versus cumulative usage.

The function or curve may be determined theoretically or empirically. For example, as shown in FIG. 4 determining the function or curve may be determined as part of the step of obtaining 401 OLED panel data. FIG. 8 is an estimate of a possible burn-in factor versus cumulative usage. As shown, the estimate of the burn-in factor (e.g., for the area) has a linear profile 820 that decreases with cumulative use. The linear profile can be represented by a function having a slope ($\alpha$) and an initial value ($\beta$). The parameters ($\alpha$, $\beta$) of the function (i.e., the estimate) can be derived from a statistical analysis of a group of similar OLED displays that are similar to the OLED display. The results of the statistical analysis can be stored in the memory for use estimating a burn-in factor from cumulative usage data. As shown in FIG. 8, the burn-in factor for a zone may be a value between zero and one and may decrease (i.e., with a negative slope, $\alpha$) from an initial value ($\beta$=1) with usage until it reaches zero (i.e., until it is burned-out). The cumulative usage for each zone can be related 810 (i.e., mapped) to an estimate of the burn-in factor as shown in FIG. 8. The relating may also include (but is not limited to) curve fitting, extrapolation, interpolation, look-up or any similar operation to perform the mapping 810 shown in FIG. 8. One or more parameters, values, or equations of the function or curve (i.e. the estimate of the burn-in versus usage) may be stored in memory and retrieved from memory 320 and may be part of the OLED panel data obtained 401 at an earlier time. The function or curve for each area of the display may be the same or different and may be any function including but not limited to the linear function, as shown in FIG. 8.

As shown in FIG. 6, estimating 420 may be repeated 429 for each zone for each area. Accordingly, the step of estimating 420 the burn-in factor for zones may output a vector for areas (e.g., each area). The vectors for an area (e.g., $F_H$ or $F_L$) include the burn-in factors (i.e., $f_{H(i)}$, $f_{L(i)}$ for zones (e.g., each zone) in the areas.

Figure 9:
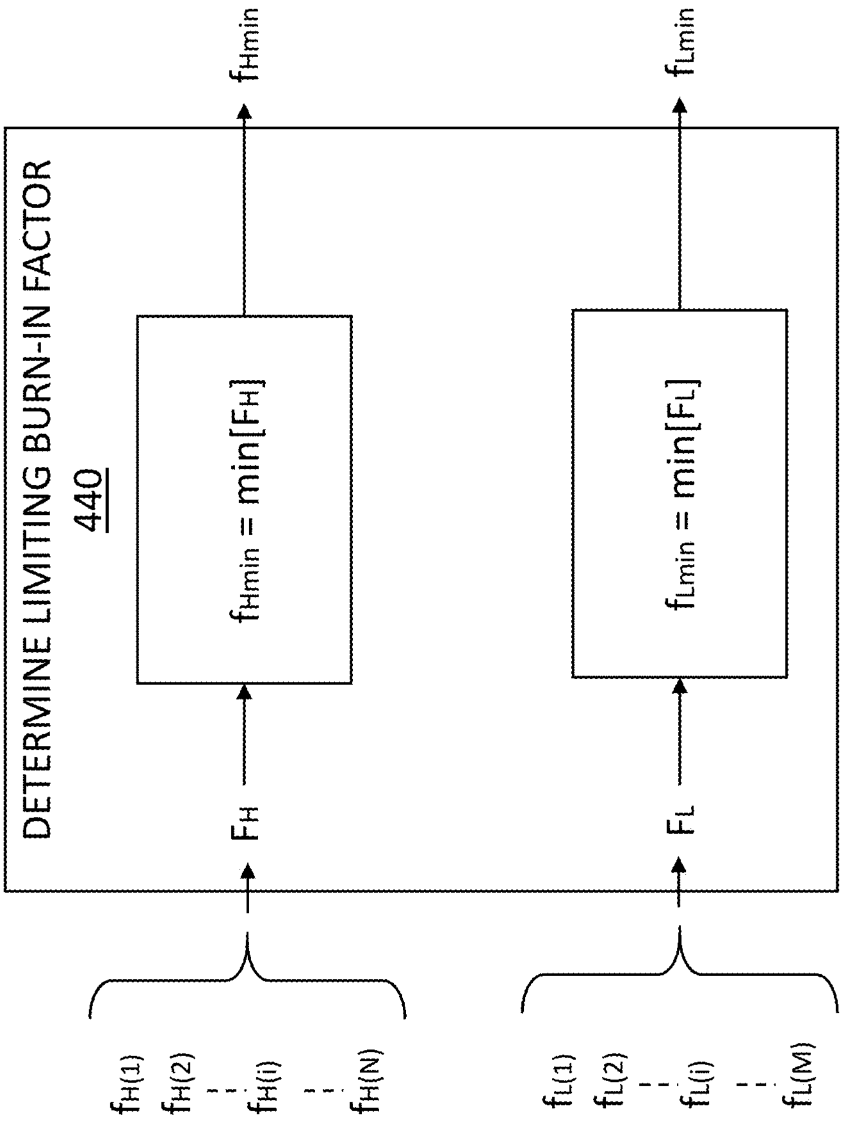
FIG. 9 is a flowchart for determining the minimum burn-in factor suitable for use in the method of FIG. 4.

FIG. 9 includes the details of the step of determining 440 the limiting burn-in factor for the area for the method shown in FIG. 4. The limiting burn-in factor corresponds to a zone of the area that is affected most by burn-in (i.e., the limiting zone). For example, the limiting zone may be the zone with the least efficient light emission for a given digital count. Accordingly, the limiting burn-in factor may be the minimum burn-in factor. To determine the minimum burn-in factor for each area, the burn-in factor vector (e.g., $F_H$ and $F_L$) may be analyzed (e.g., min($F_H$), min($F_L$)) to determine a minimum (e.g., $f_{Hmin}$, $f_{Lmin}$).

Figure 10:
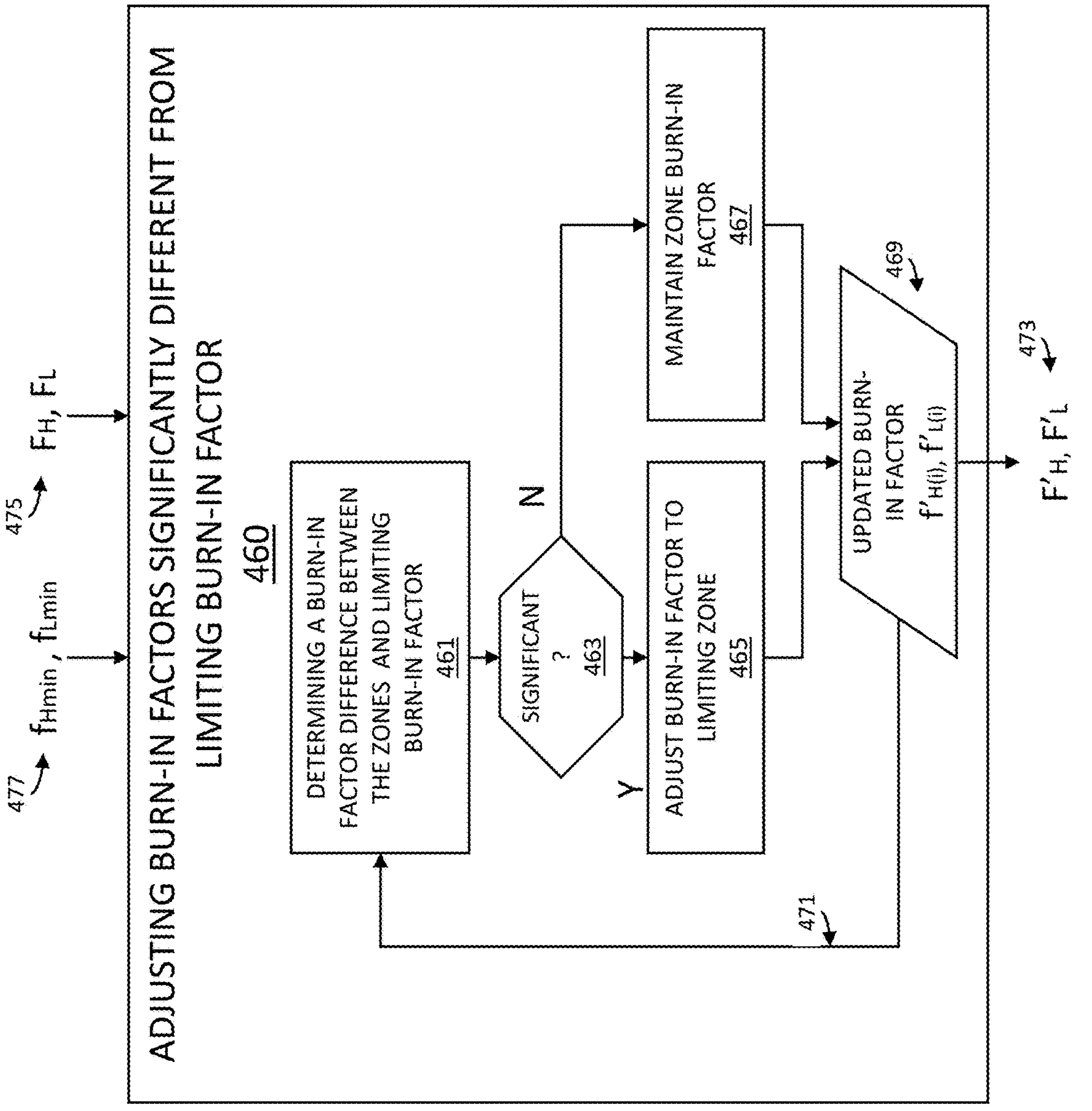
FIG. 10 is a flowchart for updating burn-in factors for zones that is suitable for use in the method of FIG. 4.

FIG. 10 includes the details of the step of adjusting 460 burn-in factors significantly different (e.g., different by an amount exceeding a threshold) from the limiting burn-in factor for the method shown in FIG. 4. As shown in FIG. 4, this step of the process can receive the burn-in factors vectors 475 for each area (e.g., $F_H$ and $F_L$) and can also receive the limiting (e.g., the minimum) burn-in factor 477 for the areas (e.g., $f_{Hmin}$, $f_{Lmin}$). Based on these inputs, a zone's burn-in factor may be adjusted if its burn-in factor is significantly different from the limiting burn-in factor or may be maintained if its burn-in factor is not significantly different from the limiting burn-in factor. The output of the adjustment 460 are updated burn-in factors for the zones. The updated burn-in factors for the zones may include burn-in factors adjusted (e.g., adjusted from a previous iteration (time)) and may also include burn-in factor maintained (i.e., not adjusted from a previous iteration (time)). The updated burn-in factors can be represented as an undated burn-in factor vector 473 (e.g., $F'_H$ and $F'_L$).

As shown in FIG. 10, updating 469 the burn-in factor for zones may be performed for each zone in each area. For a given zone in an area (e.g., $f_{H(i)}$, $f_{L(i)}$), the updating 460 process includes determining 461 (e.g., based on a comparison) a burn-in factor difference between the zone's burn-in factor and the burn-in factor of the limiting zone for the area (e.g., $f_{Hmin}$ or $f_{Lmin}$). A significance of the burn-in factor difference is evaluated and a decision 463 is made based on the significance. For example, the significance determination may include comparing the burn-in factor difference to a significance threshold (i.e., threshold). Further, the burn-in factor difference may be determined as significant if the burn-in factor difference exceeds the threshold. In one possible implementation, a difference between a zone's burn-in factor and the limiting zone's burn-in factor that is greater than 10% of the limiting burn-in factor can be considered significant. If the burn-in factor difference is significant, then the burn-in factor for the zone may be adjusted 465, and if the burn-in factor difference is not significant, then the burn-in factor for the zone may be maintained 467. Adjusting the burn-in factor may include reducing the burn-in factor for the zone by an amount based on the burn-in difference (e.g., $f_{H(i)}-f_{Hmin}$, $f_{L(i)}-f_{Lmin}$). The process may be repeated 471 for other zones (e.g., each zone) in the area, and likewise, the process may be repeated for other areas (e.g., each area).

Figure 11:
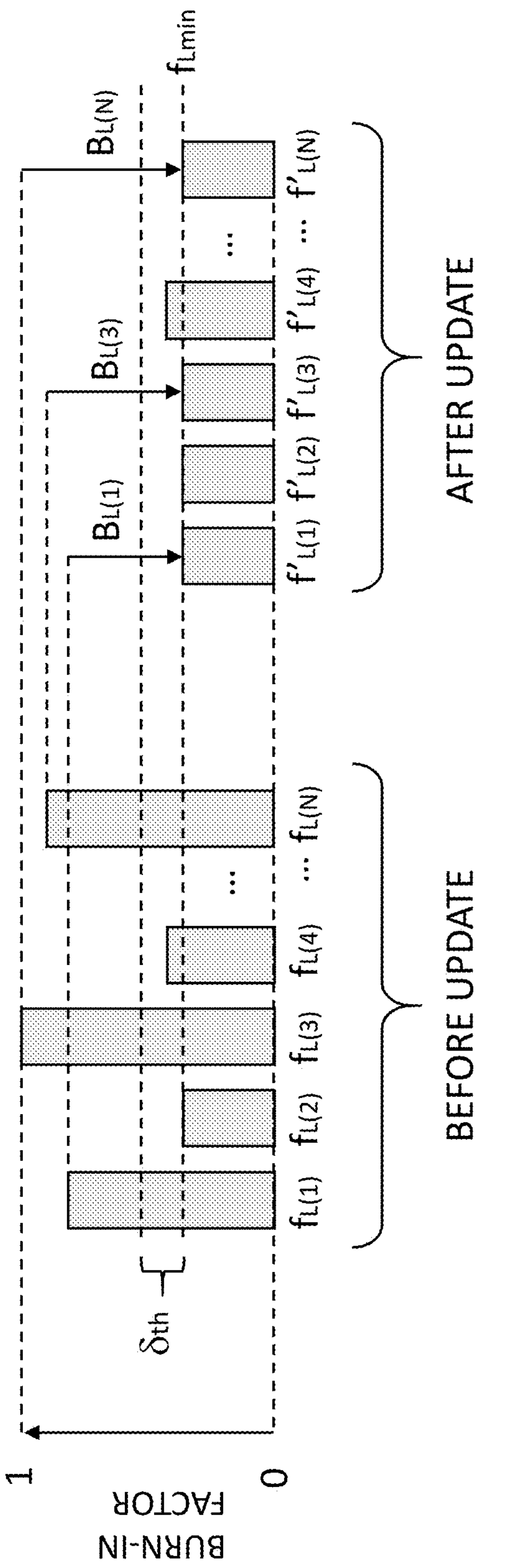
FIG. 11 graphically illustrates updating burn in factors for zones.

FIG. 11 graphically illustrates details of an example update of the burn-in factor for zones (e.g., 1, 2, 3, 4, . . . N) in an area (e.g., low-PPI area (L)). Before updating, the zones have a burn-in factors that vary widely. The burn-in factor for a zone can correspond to the radiative efficiency of a zone. Accordingly, the larger burn-in factors may correspond to zones with high efficiency than the lower burn-in factors. To make the zone appear to radiate with similar efficiency the higher efficiency zones may be calibrated to radiate at lower powers. In other words, for a particular digital count, the optical power transmitted by a zone can be reduced to match the optical power transmitted by a limiting zone for the same particular digital count. The limiting zone for the zones shown in FIG. 11 is the zone ($f_{L(2)}$) having the lowest burn-in factor ($f_{Lmin}$). The burn-in factors for the zones can be compared to lowest burn-in factor to determine if burn-in factor difference (e.g., $f_{L(1)}-f_{Lmin}$) is greater than a threshold ($\delta_{th}$), as shown in the equation below.

$$|f_{L(i)} - f_{Lmin}| \geq \delta_{th\_L}$$

For the purpose of the example shown in FIG. 11 one area is shown but in general the comparison may be performed for all areas. In this case, each area may have the same threshold or may have a different threshold.

As shown in FIG. 11, burn-in factors fL(1), fL(3) and fL(N) may can be considered significantly different from the burn-in factor of the limiting zone fL(2). Accordingly, the burn-in factors for these zones may be adjusted, each by an amount (i.e., $B_{L(1)}$, $B_{L(3)}$, $B_{L(N)}$), so that the updated burn-in factors are closer to (e.g., match) the burn-in factor for limiting zone. Mathematically, the adjustment can be expressed by the equations below.

$$f'_{L(i)} = f_{L(i)} - B_{L(i)}$$

$$B_{L(i)} = k \cdot (f_{L(i)} - f_{Lmin})$$

$$0 \leq k \leq 1$$

Figure 12:
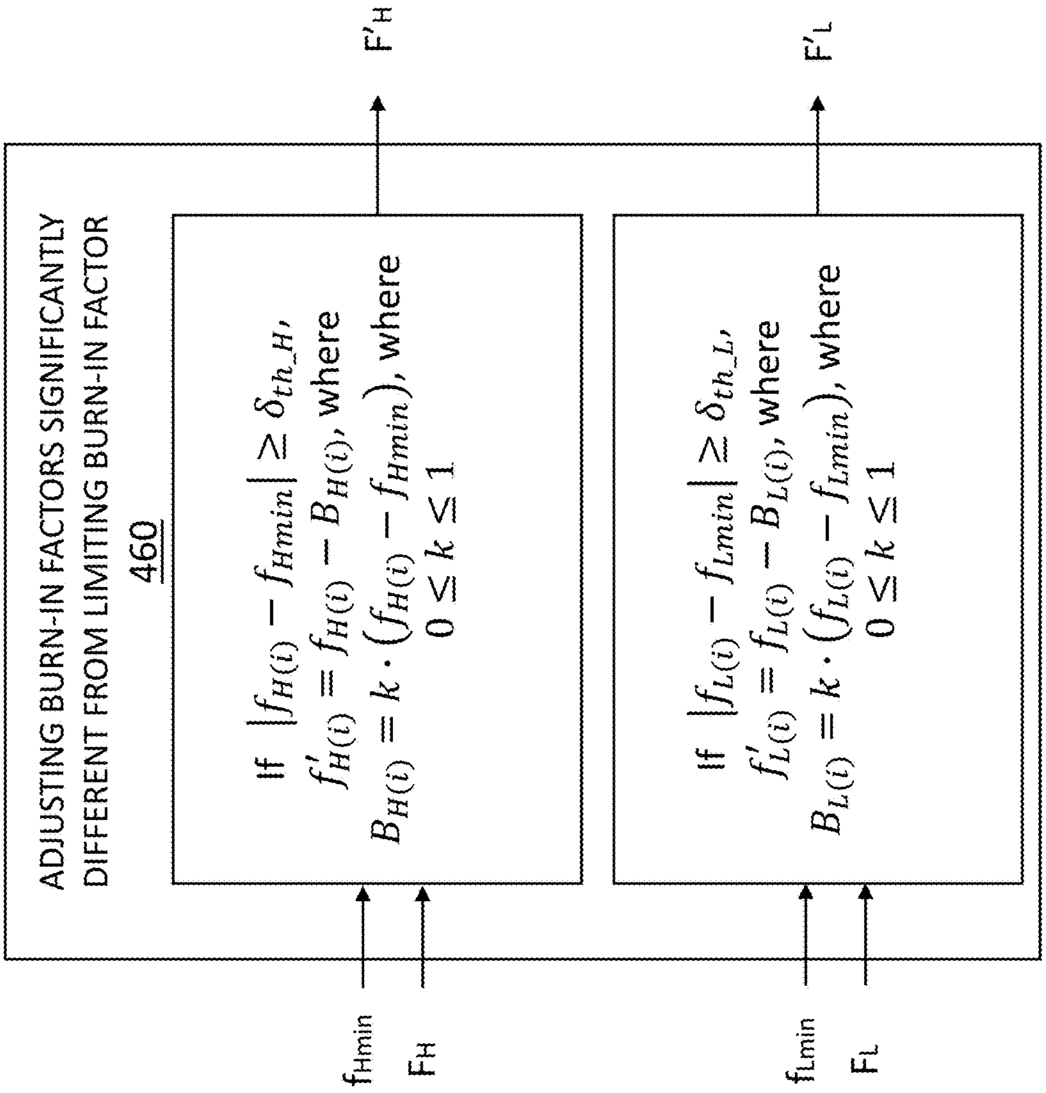
FIG. 12 is a flowchart illustrating mathematically a possible calculator for updating burn-in factors for zones that is suitable for use in the method of FIG. 4.

The factor, k, for the example shown in FIG. 11 is equal to one. In general, however a factor, k, that is less than 1 can be used. For example, a factor, k, that is less than one can used to allow a burn-in factor to be iteratively adjusted towards the limiting burn-in factor. This approach may be useful to accommodate burn-in factors that vary. A possible adjustment of the burn-in factors for a high-PPI area and a low-PPI area (e.g., see FIG. 5) is summarized mathematically in FIG. 12.

Figure 13:
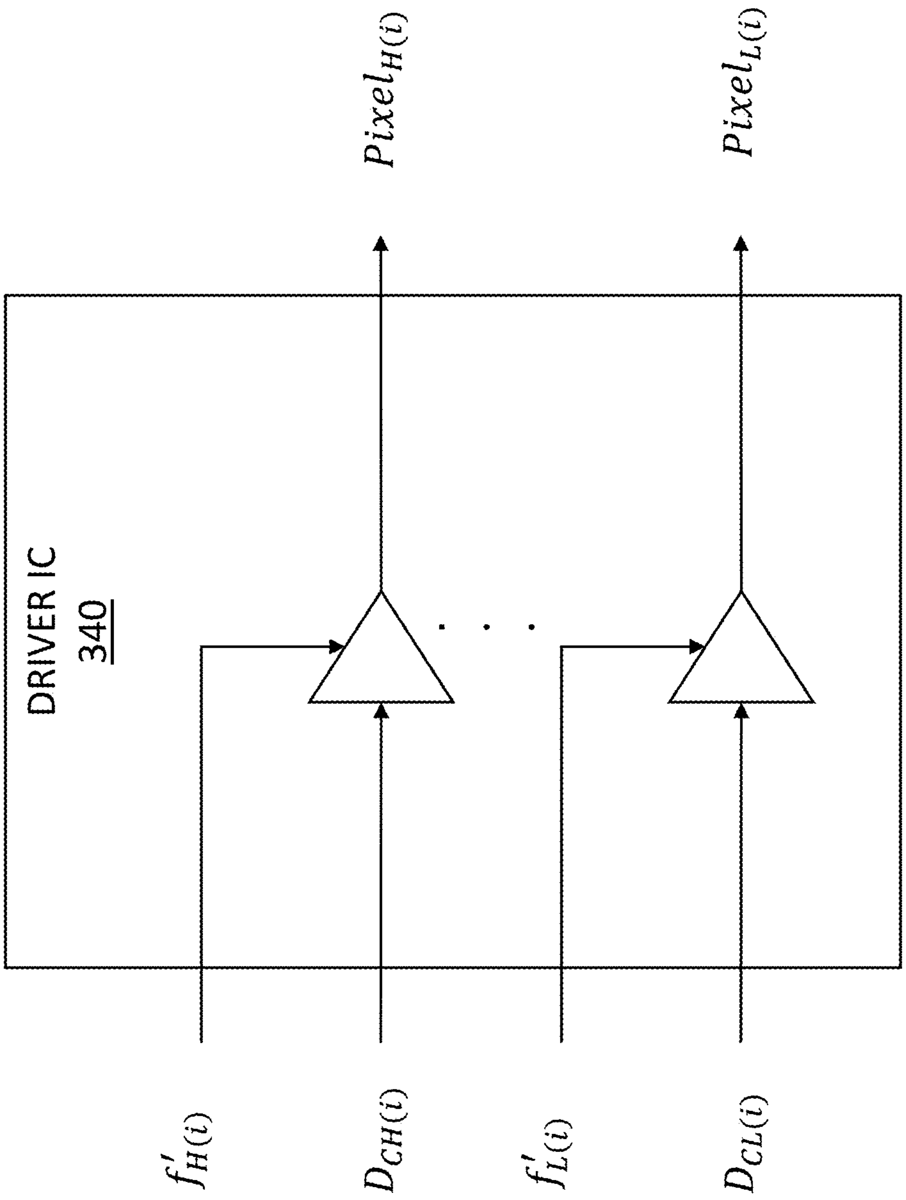
FIG. 13 is a driver IC for an OLED display having a gain configured according to an updated burn-in factor according to a possible implication of the present disclosure.

As previously mentioned, the method 400 method for burn-in compensation outputting 480 the updated burn-in factors (i.e., the maintained or adjusted burn in factors) to a driver IC. FIG. 13 illustrates a possible implementation of a driver IC. The driver IC may include multiple channels. For example, the driver IC may include a channel for each pixel in the display. Each channel can be configured to receive a digital count ($D_C$) corresponding to a pixel level of illumination. For example, a digital count may correspond to an 8-bit digital representation of an illumination level in a range of 0 to 255. The driver IC may be further configured to convert the digital count to a signal for driving a pixel. For example, driver IC may convert the digital count to a voltage (e.g., using a digital to analog converter) and may convert the voltage to a current for driving a pixel to emit light at a particular level (e.g., using a voltage-controlled current source).

In other words, the driver IC may be thought of as a multichannel amplifier with a gain for each channel controllable by the updated burn-in factor. When each channel of the multi-channel amplifier controls a pixel then all amplifiers for pixels in a zone may receive the same updated burn-in factor for control. The driver IC may have a portion of channels corresponding to each area of the OLED display.

The burn-in compensation may be thought of as a calibration of the driving signal corresponding to a digital count. As shown in FIG. 13, an updated burn-in factor ($f'_{H(i)}$, $f_{L(i)}$) can adjust the driving signal ($Pixel_{H(i)}$, $Pixel_{L(i)}$) for a pixel corresponding to a digital count ($D_{CH(i)}$, $D_{CH(i)}$) for a pixel. For example, the updated burn-in factor may adjust the maximum current delivered to a pixel for a maximum digital count. In this case, the minimum driving signal can remain zero while all other driving signals can be adjusted to equally span the range of digital counts.

The burn-in compensation for each area may be derived and applied independently. For example, in the display shown in FIG. 5 the first area (e.g., the high PPI-area) can have zones adjusted to be similar to a first burn-in factor ($f_{Hmin}$), while the second area (e.g., the low-PPI area can have zones adjusted to be similar to a second burn-in factor ($f_{Lmin}$). This difference can (in some cases) result in a variation in intensity (i.e. visible artifact) at a boundary between the areas. Accordingly, in some implementations, a transition area may be defined between the areas over which the burn-in factor for the areas can be transitioned.

Figure 14:
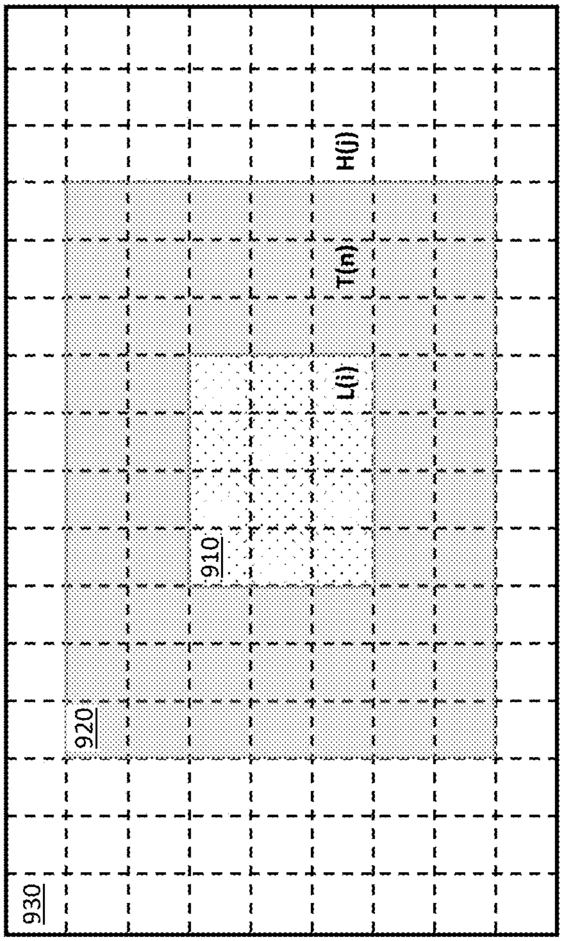
FIG. 14 is an illustration of an example OLED display divided into areas and zones according to an implementation of the disclosure.

FIG. 14. is a front view of an OLED display that includes a low-PPI area 910, a high-PPI area 930, and a transition area 920 therebetween. The low-PPI area, the high-PPI area, and transition area are each divided into zones (i.e., designated by dotted lines). An $i^{th}$ zone in the low-PPI area can be designated as L(i) and can have a burn-in factor designated as $f_{L(i)}$, and the $j^{th}$ zone in the high-PPI area can be designated as H(j) and has a burn-in factor designated as filo). An nth zone in the transition area can be designated as T(n). A burn-in factor for the transition area can be designated as $f_{T(n)}$ and may be computed according to an equation that includes a weighting function (i.e., w(n)) to provide a smooth burn-in factor change across zones of the transition area between the low-PPI area and the high PPI area, as shown in the equation below.

$$f_{T(n)} = w(n)f_{H(j)} + (1 - w(n))f_{L(i)}$$

Figure 15:
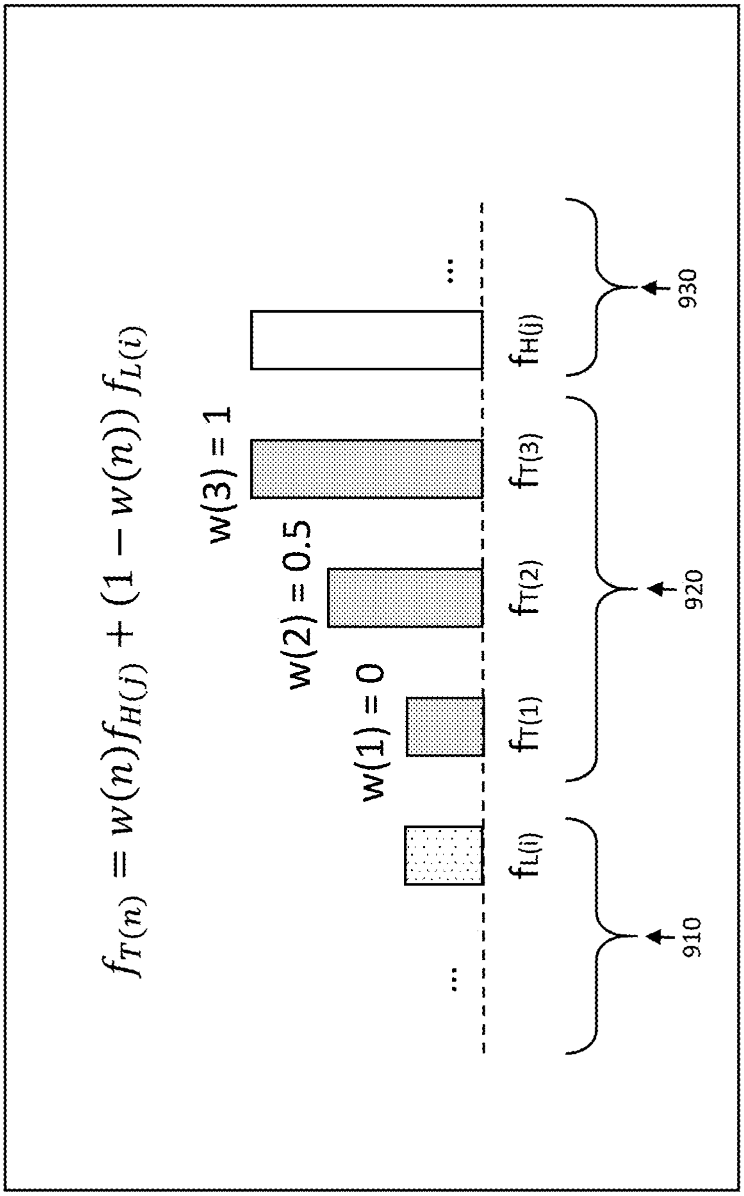
FIG. 15 is an illustration of a burn-in factor computation for a transition area between a low pixel density area and a high pixel density area.

Three burn-in factors can be computed for the transition area zones (i.e., T(1), T(2), T(3) between low-PPI zone (L(i)) and high-PPI zone (H(i)) shown in FIG. 14. FIG. 15, illustrates an example burn-in computation. As shown, the weighting function gradually changes (i.e., increases) as the zones progress from the low-PPI zone 910 to the high-PPI zone 930 through the zones in the transition area 920. Based on the equation above, the transition zone (i.e., T(3)) adjacent to the high-PPI zone (H(j)) can have the same burn-in factor as the high-PPI zone (i.e. $f_{T(3)}=f_{H(j)}$). Likewise, the transition zone (i.e., T(1)) adjacent to the low-PPI zone (L(i)) can have the same burn-in factor as the low-PPI zone (i.e. $f_{T(1)}=f_{L(i)}$). The zone between the adjacent zones can have a burn-in factor ($f_{r(2)}$) between these burn-in factors. For example, this zone may be the average of the other zones. The example shown in FIG. 15, is non-limiting. In general, the transition area 920 may include any number of zones between a first area and a second area.

The transition area 920 may be designated as part of the high-PPI area or may be designated as part of the low-PPI area. In other words, the transition area may have a pixel density (i.e., pixel resolution) that matches the high-PPI area or the low-PPI area.

Figure 16:
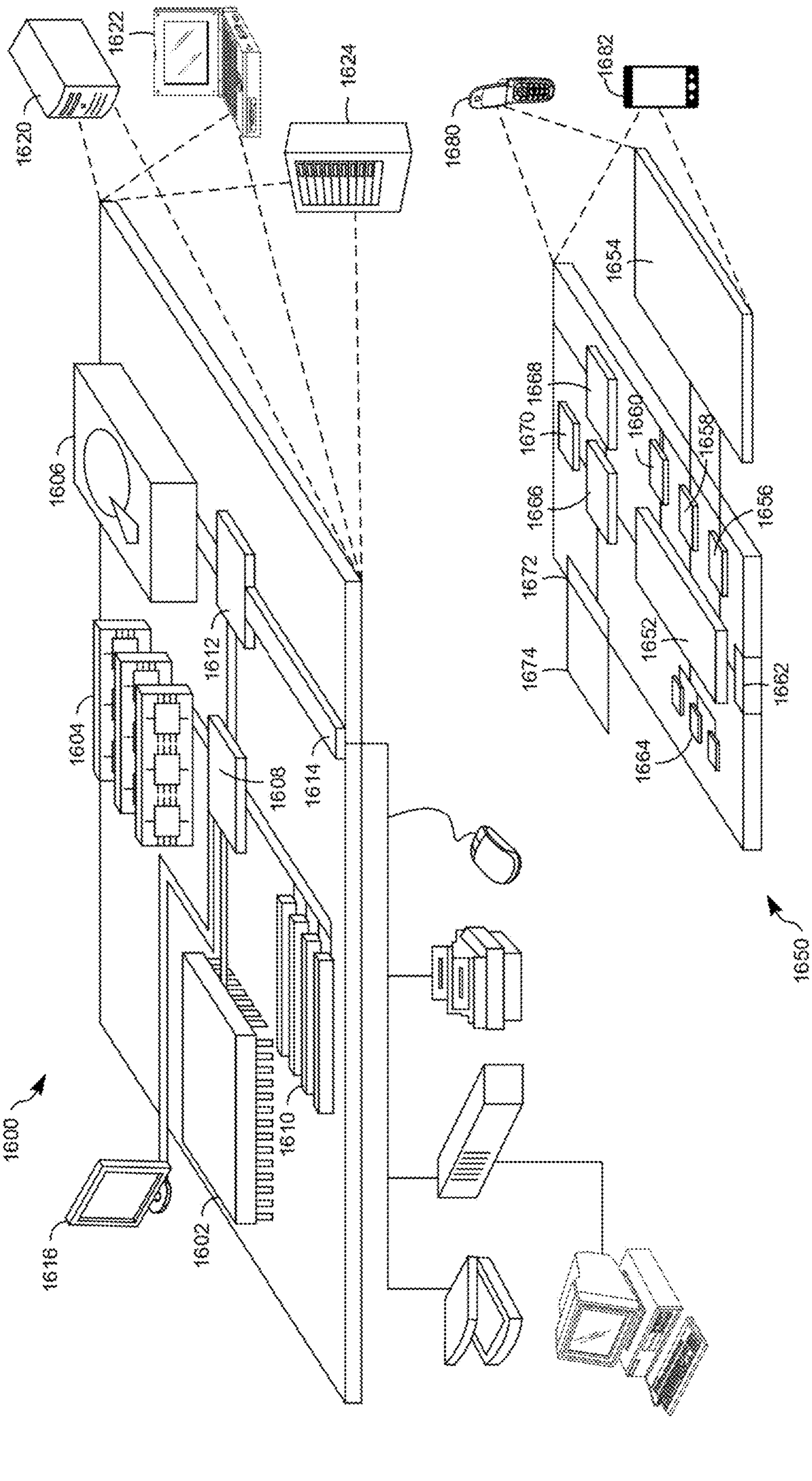
FIG. 16 shows an example of a computer device and a mobile computer device that can be used to implement the techniques described here.

FIG. 16 shows an example of a generic computer device 1600 and a generic mobile computer device 1650, which may be used with the techniques described here. Computing device 1600 is intended to represent various forms of digital computers, such as laptops, desktops, tablets, workstations, personal digital assistants, televisions, servers, blade servers, mainframes, and other appropriate computing devices.

Computing device 1650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1600 includes a processor 1602, memory 1604, a storage device 1606, a high-speed interface 1608 connecting to memory 1604 and high-speed expansion ports 1610, and a low speed interface 1612 connecting to low speed bus 1614 and storage device 1606. The processor 1602 can be a semiconductor-based processor. The memory 1604 can be a semiconductor-based memory. Each of the components 1602, 1604, 1606, 1608, 1610, and 1612, are interconnected using various busses, and may be mounted on a common motherboard or in other manners as appropriate. The processor 1602 can process instructions for execution within the computing device 1600, including instructions stored in the memory 1604 or on the storage device 1606 to display graphical information for a GUI on an external input/output device, such as display 1616 coupled to high speed interface 1608. In other implementations, multiple processors and/or multiple buses may be used, as appropriate, along with multiple memories and types of memory. Also, multiple computing devices 1600 may be connected, with each device providing portions of the necessary operations (e.g., as a server bank, a group of blade servers, or a multi-processor system).

The memory 1604 stores information within the computing device 1600. In one implementation, the memory 1604 is a volatile memory unit or units. In another implementation, the memory 1604 is a non-volatile memory unit or units. The memory 1604 may also be another form of computer-readable medium, such as a magnetic or optical disk.

The storage device 1606 is capable of providing mass storage for the computing device 1600. In one implementation, the storage device 1606 may be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1604, the storage device 1606, or memory on processor 1602.

The high-speed controller 1608 manages bandwidth-intensive operations for the computing device 1600, while the low speed controller 1612 manages lower bandwidth-intensive operations. Such allocation of functions is exemplary only. In one implementation, the high-speed controller 1608 is coupled to memory 1604, display 1616 (e.g., through a graphics processor or accelerator), and to high-speed expansion ports 1610, which may accept various expansion cards (not shown). In the implementation, low-speed controller 1612 is coupled to storage device 1606 and low-speed expansion port 1614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1600 may be implemented in a number of different forms, as shown in the figure. For example, it may be implemented as a standard server 1620, or multiple times in a group of such servers. It may also be implemented as part of a rack server system 1624. In addition, it may be implemented in a personal computer such as a laptop computer 1622. Alternatively, components from computing device 1600 may be combined with other components in a mobile device (not shown), such as device 1650. Each of such devices may contain one or more of computing device 1600, 1650, and an entire system may be made up of multiple computing devices 1600, 1650 communicating with each other.

Computing device 1650 includes a processor 1652, memory 1664, an input/output device such as a display 1654, a communication interface 1666, and a transceiver 1668, among other components. The device 1650 may also be provided with a storage device, such as a microdrive or other device, to provide additional storage. Each of the components 1650, 1652, 1664, 1654, 1666, and 1668, are interconnected using various buses, and several of the components may be mounted on a common motherboard or in other manners as appropriate.

The processor 1652 can execute instructions within the computing device 1650, including instructions stored in the memory 1664. The processor may be implemented as a chipset of chips that include separate and multiple analog and digital processors. The processor may provide, for example, for coordination of the other components of the device 1650, such as control of user interfaces, applications run by device 1650, and wireless communication by device 1650.

Processor 1652 may communicate with a user through control interface 1658 and display interface 1656 coupled to a display 1654. The display 1654 may be, for example, a TFT LCD (Thin-Film-Transistor Liquid Crystal Display) or an OLED (Organic Light Emitting Diode) display, or other appropriate display technology. The display interface 1656 may comprise appropriate circuitry for driving the display 1654 to present graphical and other information to a user. The control interface 1658 may receive commands from a user and convert them for submission to the processor 1652. In addition, an external interface 1662 may be provided in communication with processor 1652, so as to enable near area communication of device 1650 with other devices. External interface 1662 may provide, for example, for wired communication in some implementations, or for wireless communication in other implementations, and multiple interfaces may also be used.

The memory 1664 stores information within the computing device 1650. The memory 1664 can be implemented as one or more of a computer-readable medium or media, a volatile memory unit or units, or a non-volatile memory unit or units. Expansion memory 1674 may also be provided and connected to device 1650 through expansion interface 1672, which may include, for example, a SIMM (Single In Line Memory Module) card interface. Such expansion memory 1674 may provide extra storage space for device 1650 or may also store applications or other information for device 1650. Specifically, expansion memory 1674 may include instructions to carry out or supplement the processes described above and may include secure information also. Thus, for example, expansion memory 1674 may be provided as a security module for device 1650 and may be programmed with instructions that permit secure use of device 1650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1664, expansion memory 1674, or memory on processor 1652, that may be received, for example, over transceiver 1668 or external interface 1662.

Device 1650 may communicate wirelessly through communication interface 1666, which may include digital signal processing circuitry where necessary. Communication interface 1666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1668. In addition, short-range communication may occur, such as using a Bluetooth, WiFi, or other such transceiver (not shown). In addition, GPS (Global Positioning System) receiver module 1670 may provide additional navigation- and location-related wireless data to device 1650, which may be used as appropriate by applications running on device 1650.

Device 1650 may also communicate audibly using audio codec 1660, which may receive spoken information from a user and convert it to usable digital information. Audio codec 1660 may likewise generate audible sound for a user, such as through a speaker, e.g., in a handset of device 1650. Such sound may include sound from voice telephone calls, may include recorded sound (e.g., voice messages, music files, etc.) and may also include sound generated by applications operating on device 1650.

The computing device 1650 may be implemented in a number of different forms, as shown in the figure. For example, it may be implemented as a cellular telephone 1680. It may also be implemented as part of a smart phone 1682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A mobile computing device comprising:

an OLED display panel that includes a plurality of areas having different pixel densities, including a first area with a first pixel density and a second area with a second pixel density that is different from the first pixel density, each of the plurality of areas having a plurality of zones that each include one or more pixels;

a driver integrated circuit (IC) configured to, for each pixel in each of the plurality of areas, convert a digital count into a driving signal that causes the respective pixel to radiate light at a level corresponding to the digital count;

an applications processor configured by software instructions to reduce effects of a burn-in of pixels of the OLED display by:

estimating first area burn-in factors for the plurality of zones in the first area of the OLED display;

determining a first limiting burn-in factor from the estimated first area burn-in factors;

adjusting the estimated first area burn-in factors that are significantly different from the limiting first area burn-in factor;

updating, in a memory, the estimated first area burn-in factors for the plurality of zones in the first area to include the adjusted first area burn-in factors;

controlling the driver IC to adjust the driving signal for the plurality of pixels in each zone of the first area according to a corresponding updated first area burn-in factor to reduce the effects of burn-in of the first area of the OLED display;

estimating second area burn-in factors for the plurality of zones in the second area of the OLED display;

determining a second limiting burn-in factor from the estimated second area burn-in factors;

adjusting the estimated second area burn-in factors that are significantly different from the limiting second area burn-in factor;

updating, in a memory, the estimated second area burn-in factors for the plurality of zones in the second area to include the adjusted second area burn-in factors; and controlling the driver IC to adjust the driving signal for the plurality of pixels in each zone of the second area according to a corresponding updated second area burn-in factor to reduce the effects of burn-in of the second area of the OLED display.

2. The mobile computing device according to claim 1, wherein the applications processor is further configured by software instructions to minimize a burn-in of the first and second areas of the OLED display by:

repeating the estimating, the determining, the adjusting, the updating, and the controlling for each of the first and second areas of the OLED display to minimize the effects of burn-in in the first and second areas of the OLED display over time.

3. A method for reducing effects of burn-in of an OLED display, the method comprising:

estimating first area burn-in factors for a plurality of zones in a first area of the OLED display, wherein the estimated first area burn-in factor for each zone in the plurality of zones indicates a pixel efficiency of the respective zone;

determining a limiting first area burn-in factor from the estimated first area burn-in factors;

adjusting the estimated first area burn-in factors that are significantly different from the limiting first area burn-in factor;

updating, in a memory, the estimated first area burn-in factors for the plurality of zones in the first area to include the adjusted first area burn-in factors;

controlling a driver integrated circuit (IC) according to the updated first area burn-in factors to reduce the effects of burn-in in the first area of the OLED display;

estimating second area burn-in factors for a plurality of zones in a second area of the OLED display, wherein the second area of the OLED display has a pixel density that is different from a pixel density of the first area of the OLED display;

determining a limiting second area burn-in factor from the estimated second area burn-in factors;

adjusting the estimated second area burn-in factors that are significantly different from the limiting second area burn-in factor;

updating, in the memory, the estimated second area burn-in factors for the plurality of zones in the second area to include the adjusted second area burn-in factors; and controlling the driver IC according to the updated second area burn-in factors to reduce the effects of burn-in in the second area of the OLED display.

4. The method according to claim 3, further comprising:

repeating the estimating, the determining, the adjusting, the updating, and the controlling for the first area of the OLED display to minimize the effects of burn-in in the first area of OLED display over time.

5. The method according to claim 3, wherein:

the first area of the OLED display has a high-pixels-per-inch (high-PPI) density; and the second area of the OLED display has a low-pixels-per-inch (low-PPI) density that is lower than the high-PPI density.

6. The method according to claim 5, further comprising:

designating a transition area between the first area with the high-PPI density and the second area with the low-PPI density; and computing burn-in factors for the transition area that gradually change from the first area to the second area.

7. The method according to claim 3, wherein:

each zone of the plurality of zones in the first area includes one or more pixels; and each of the one or more pixels in each zone of the plurality of zones in the first area is driven according to the updated first area burn-in factor for the respective zone.

8. The method according to claim 3, wherein the limiting first area burn-factor is different from the limiting second area burn-in factor.

9. The method according to claim 3, wherein controlling the driver IC according to the updated first area burn-in factors and controlling the driver IC according to the updated second area burn-in factors results in a variation in intensity at a boundary between the first area of the OLED display and the second area of the OLED display.

10. A non-transitory computer readable storage medium containing program code that when executed by a processor of a computing device causes the computing device to perform a method for reducing effects of burn-in of an OLED display of the computing device, the method comprising:

estimating first area burn-in factors for a plurality of zones in a first area of the OLED display, wherein the estimated first area burn-in factor for each zone in the plurality of zones indicates a pixel efficiency of the respective zone;

determining a limiting first area burn-in factor from the estimated first area burn-in factors;

adjusting the estimated first area burn-in factors that are significantly different from the limiting first area burn-in factor;

updating, in a memory, the estimated first area burn-in factors for the plurality of zones in the first area to include the adjusted first area burn-in factors;

controlling a driver integrated circuit (IC) according to the updated first area burn-in factors to reduce the effects of burn-in in the first area of the OLED display;

estimating second area burn-in factors for a plurality of zones in a second area of the OLED display, wherein the second area of the OLED display has a pixel density that is different from a pixel density of the first area of the OLED display;

determining a limiting second area burn-in factor from the estimated second area burn-in factors;

adjusting the estimated second area burn-in factors that are significantly different from the limiting second area burn-in factor;

updating, in the memory, the estimated second area burn-in factors for the plurality of zones in the second area to include the adjusted second area burn-in factors; and controlling the driver IC according to the updated second area burn-in factors to reduce the effects of burn-in in the second area of the OLED display.

* * * * *